Jan. 10, 1967 H. C. GILLEN ET AL 3,296,843

PLANISHING METHOD AND APPARATUS

Filed Aug. 1, 1960 10 Sheets-Sheet 1

INVENTORS
RUDOLPH HORN
HOWARD C. GILLEN

BY

ATTORNEY

INVENTORS
RUDOLPH HORN
HOWARD C. GILLEN
BY
ATTORNEY

Jan. 10, 1967 H. C. GILLEN ET AL 3,296,843

PLANISHING METHOD AND APPARATUS

Filed Aug. 1, 1960 10 Sheets-Sheet 3

*INVENTORS*
RUDOLPH HORN
HOWARD C. GILLEN
*BY* [signature]
ATTORNEY

PLANISHING METHOD AND APPARATUS

Filed Aug. 1, 1960 10 Sheets-Sheet 4

INVENTORS
RUDOLPH HORN
HOWARD C. GILLEN
BY
ATTORNEY

PLANISHING METHOD AND APPARATUS

*INVENTORS*
RUDOLPH HORN
HOWARD C. GILLEN
*BY* [signature]
ATTORNEY

Jan. 10, 1967 H. C. GILLEN ETAL 3,296,843

PLANISHING METHOD AND APPARATUS

Filed Aug. 1, 1960 10 Sheets-Sheet 6

INVENTORS
RUDOLPH HORN
HOWARD C. GILLEN
BY
ATTORNEY

PLANISHING METHOD AND APPARATUS

Filed Aug. 1, 1960 10 Sheets-Sheet 7

*INVENTORS*
RUDOLPH HORN
HOWARD C. GILLEN
*BY*
ATTORNEY

INVENTORS
RUDOLPH HORN
HOWARD C. GILLEN
BY [signature]
ATTORNEY

PLANISHING METHOD AND APPARATUS

Filed Aug. 1, 1960 10 Sheets-Sheet 9

*INVENTORS*
RUDOLPH HORN
HOWARD C. GILLEN
*BY* [signature]
ATTORNEY

PLANISHING METHOD AND APPARATUS

Filed Aug. 1, 1960 10 Sheets-Sheet 10

*INVENTOR.*
RUDOLPH HORN
HOWARD C. GILLEN
*BY* [signature]
ATTORNEY

United States Patent Office 3,296,843

Patented Jan. 10, 1967

3,296,843

PLANISHING METHOD AND APPARATUS

Howard C. Gillen, Inglewood, and Rudolph Horn, Los Angeles, Calif., assignors to North American Aviation, Inc.

Filed Aug. 1, 1960, Ser. No. 46,528
18 Claims. (Cl. 72—28)

Figure 1:
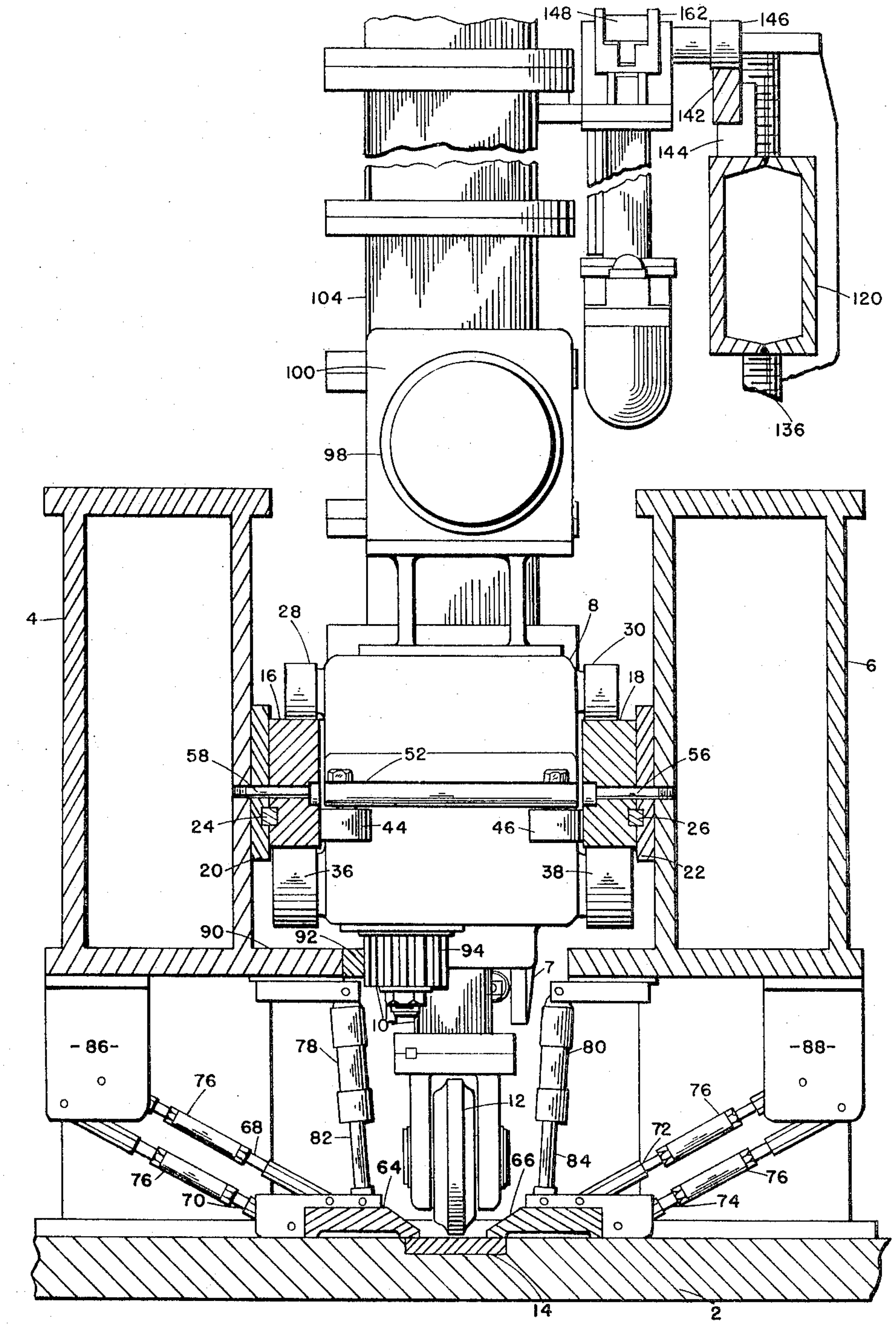

This invention concerns method and apparatus for smoothing and shaping objects as well as increasing their strength to produce surfaces and seams of improved form and superior physical properties. More particularly, the invention contemplates an improved method and apparatus for planishing seams between relatively thin metal sheets and objects fabricated from such sheets, to improve surfaces and joints thereof such as weld joints.

The invention disclosed herein is applicable to the planishing of any article which can be held between clamps while a surface substantially planar in form is presented for rolling action of an arcuate element, regardless of the precise composition, shape or dimensions of such article. However, a particular need for this invention arose in connection with the planishing of weld seams between thin sheets of advanced alloy material during fabrication of ultra high speed type aerial vehicles, wherein the techniques and materials formerly employed for conventional supersonic aircraft and missiles are often unsatisfactory. Structure used in vehicles of the stated type must be capable of withstanding the extreme temperatures and stresses encountered during operation of the vehicle, in an environment previously unknown in the aircraft art. As a specific example, thin sheet metal skin surfaces such as formerly used in aircraft construction are totally inadequate, and reinforced skin surfaces of honeycomb sandwich panel type are necessary. In the manufacture of such panels, thick slabs of honeycomb core material of thin metal foil are accurately cut to produce uniform thickness throughout the section, and are thereafter oven brazed to sheet metal top and bottom panel surfaces. Materials of construction formerly in wide use are largely unsuitable in vehicles of the stated type, and have of necessity been discarded in favor of advanced type alloys of increased hardness and strength, with consequent decrease in machinability, requiring specialized fabrication techniques.

Fabrication of honeycomb sandwich panels in sections of the type referred to above involves the use of relatively huge expanses of thin sheet metal as little as .006 inch thick for the top and bottom panel surfaces. Due to inherent limitations in the rolling process used for manufacture of advanced type alloy sheets, the maximum width obtainable in a sheet .006 inch thick is 16 feet. Therefore, it is necessary to use a plurality of the stated sheets, joined together along their adjacent edges, to form top and bottom surfaces in the panels described above. Welding is the most acceptable method of joinder between such sheets, based upon consideration of factors such as cost, overall strength, and economy of weight for welding as against various alternative fastening means.

However, welding of material in extremely thin sheet form along edges of the lengths involved in the problem situations stated above requires specialized techniques not heretofore known in the welding art. Since the welding temperature is often much higher than the melting point of the base metal and some of this heat permeates the area surrounding the weld, thermal effects such as residual and heat stress are considerably exaggerated. Residual and heat stresses are highly detrimental to the strengths of the welded article, and produce severe distortion in the case of thin walled members. Accurate fitting of welded components in vehicles of the stated class is essential, especially where large sections must be joined together along continuous high-strength weld seams, and avoidance of the slightest distortion and resulting misalignment are commensurately important. Such distortion is further unacceptable in view of the extremely close tolerances required for joinder of the welded sheets to honeycomb core material, wherein a maximum clearance for bracing between the core and the sheet is on the order of 0.005 inch maximum throughout the entire area of the stated panel.

In avoiding the deleterious effects referred to above, it has been found expedient to accomplish precision welding by a high temperature welding head which moves rapidly along an automatically controlled path of travel which fuses the two adjoining edges of the sheet sections together in a single pass. Thus, a minimum of weld heat is absorbed by the base metal, and the amount of distortion resulting therefrom is commensurately diminished. After the welding operation is accomplished as referred to above, additional steps are necessary to remedy the effect of the residual and heat stresses referred to above, the most practical approach being to planish or cold roll the weld seam.

In the prior art, planishing or cold rolling of sheet metal is normally accomplished by devices comprising two rotating wheels with their peripheral surfaces contacting each other. In devices of this type, the planishing wheels both rotate but are otherwise stationary and the material to be planished is moved translationally between the rotating wheels while opposing force is applied to the wheels, compressing the material therebetween. Use of such devices entails the application of force on the material to steer the same through the planishing wheels, to produce a relative path of travel which will result in planishing the desired area. Since sheet metal of .006 inch thickness and 16 feet width cannot even be lifted in the unrolled condition without causing canning or angular deformations which produce permanent dents or dings at their apices, material of this type cannot be steered through any device requiring tugging or pushing of the material, hence conventional planishers are unsuitable for planishing such sheets.

Due to the sensitive nature of metal in foil or thin sheet form, and the handling problems incident thereto, it is a basic requirement in planishing such material that the device which accomplishes the planishing must permit accurate coverage along a predetermined path without necessitating movement of the material by the application of force thereon.

Also, since it is a vital consideration in the problem statement set forth above that the planishing force be applied precisely at the location of the joint or other surface being cold rolled regardless of the hardness of the material being trimmed, or variations in its thickness, it is a further requirement that the device which accomplishes the planishing incorporate means preventing displacement of the material by variations in the force exerted on the material by the planishing wheel during its movement along a predetermined path.

In addition, since the problem statement described above includes use of material of tapered or otherwise non-uniform thickness for use in the fabrication of structures in which load stresses are not uniform, it is a further requirement in the device for planishing such material that means be incorporated for adjusting the device to produce a precise thickness or hardness of the planished area regardless of such variations in initial hardness or thickness of the material.

Accordingly, it is a principal object of the instant invention to provide apparatus for planishing material with improved accuracy by applying force in an amount and a direction sufficient to cold work the material along a precise predetermined path of movement.

It is a further object of this invention to provide apparatus as set forth in these objects incorporating means by which extremely accurate planishing may be accomplished without necessitating movement of the material being planished.

Also, it is an additional object of the invention disclosed herein to provide apparatus for planishing with improved accuracy material of tapered or otherwise non-uniform thickness.

It is an additional object of this invention to provide apparatus for planishing or forming material with improved accuracy including means permitting precise adjustment of the apparatus to accommodate materials of different thickness or hardness, or different conditions of the surface being planished.

Figure 2:
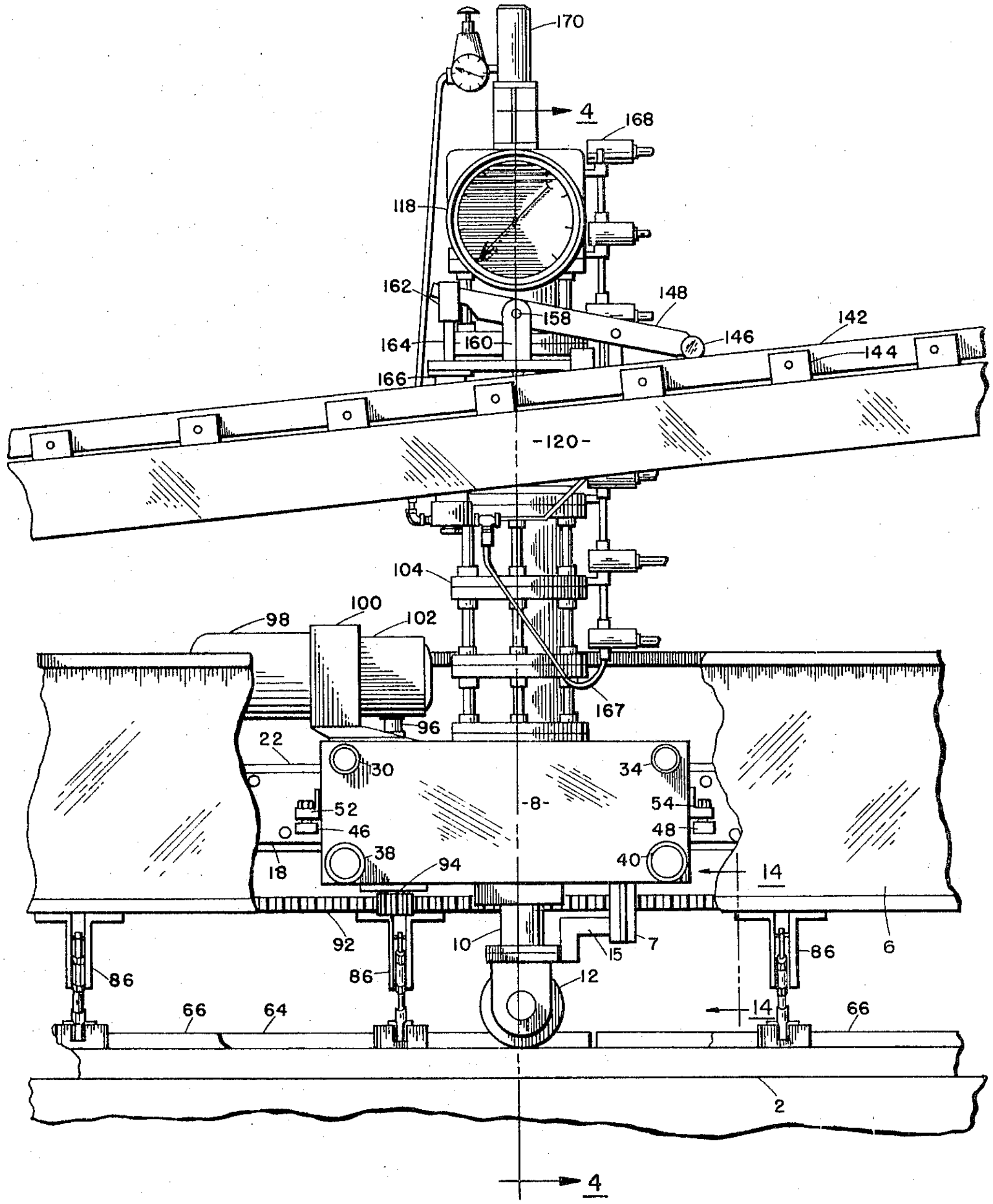
Figure 3:
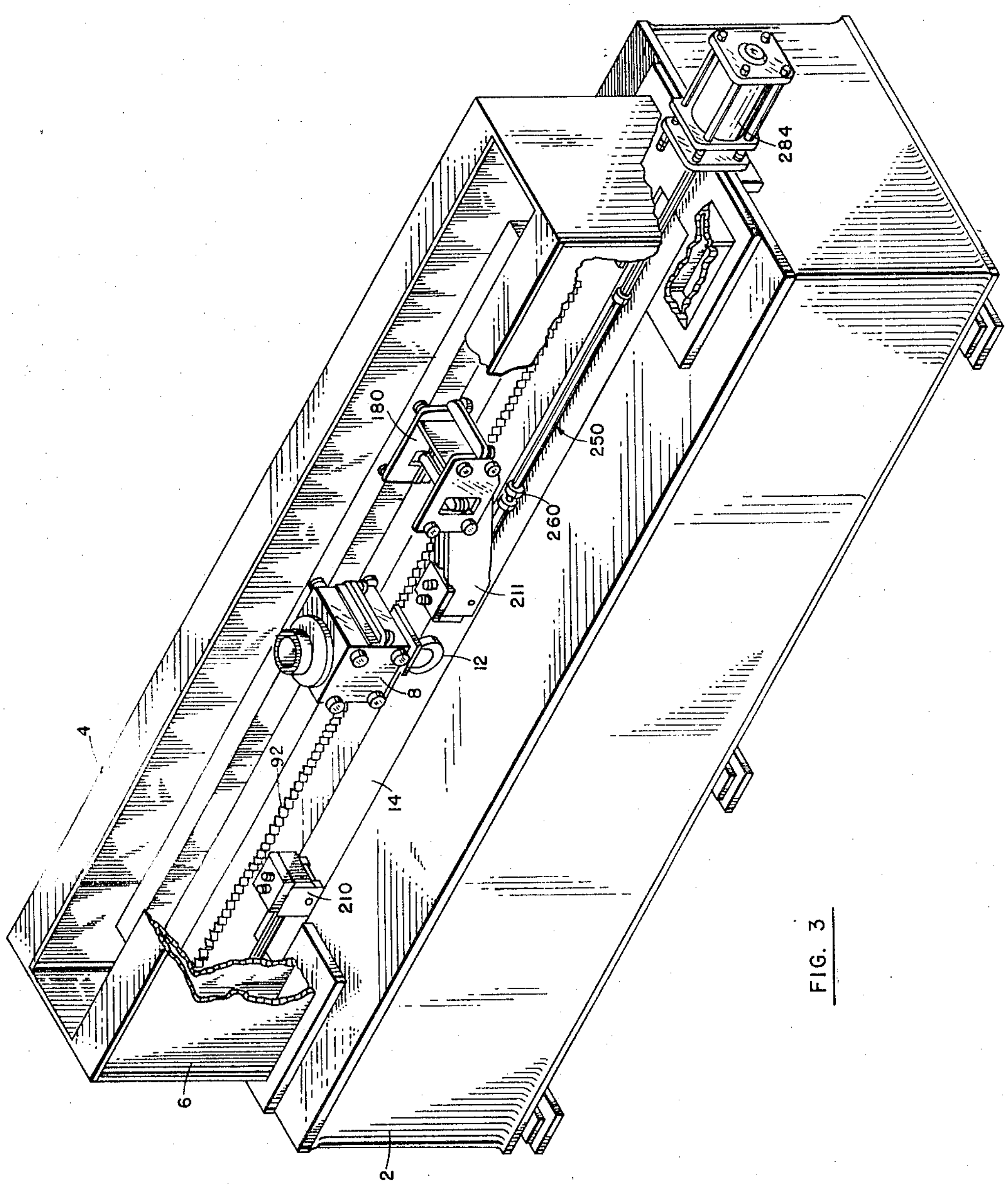
Figures 4, 14:
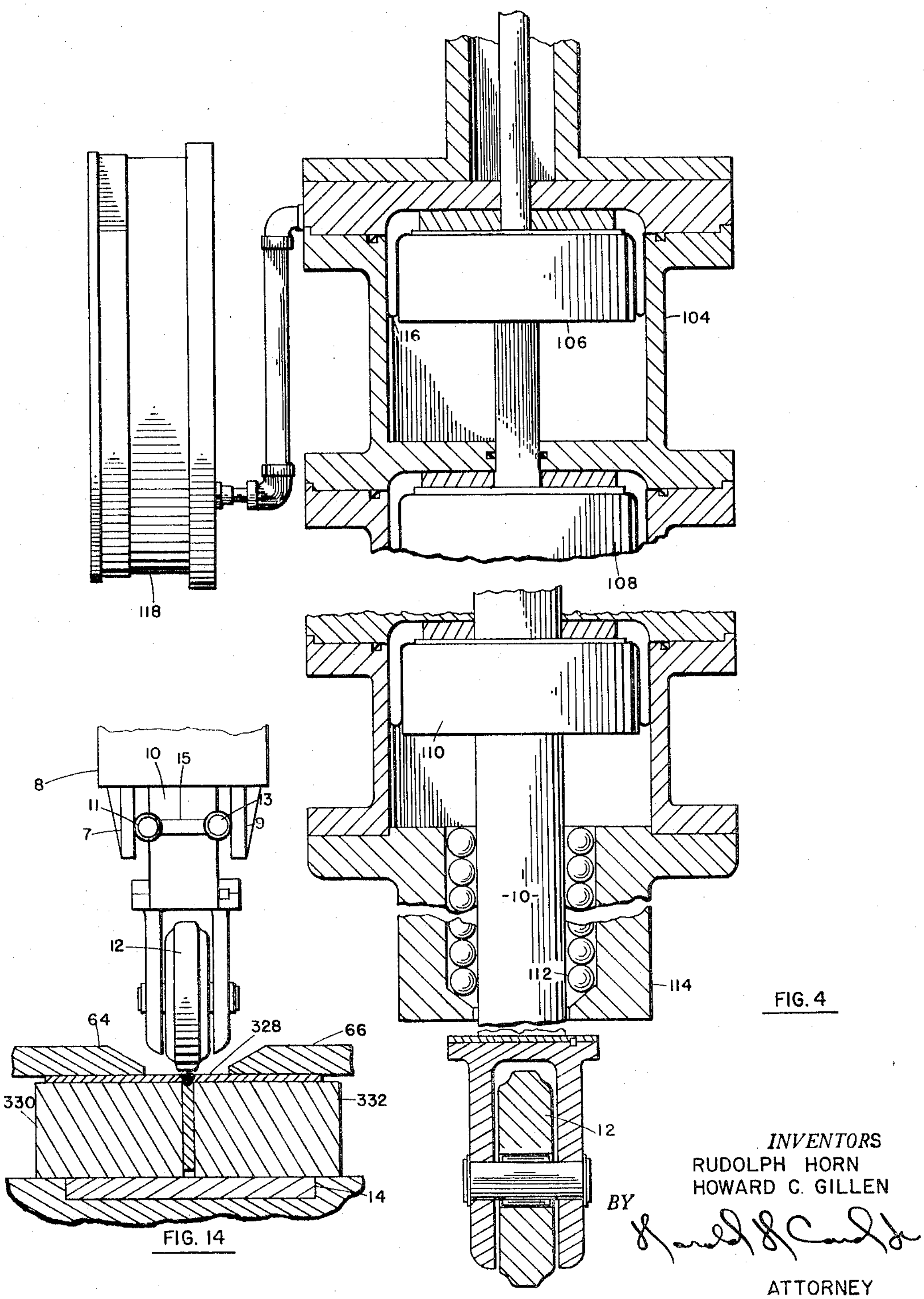
Figure 5:
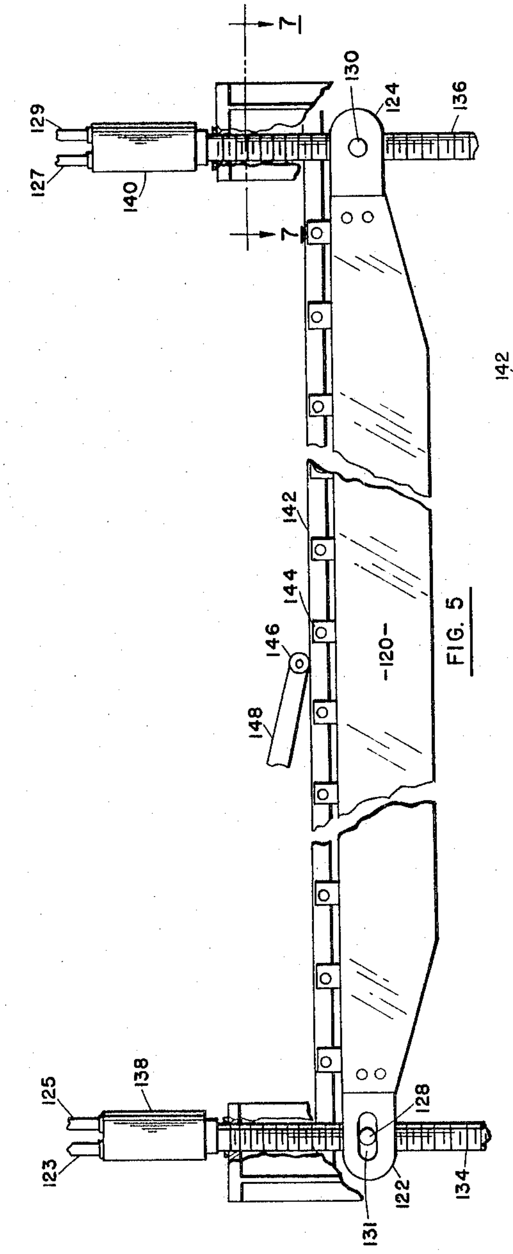
Figure 7:
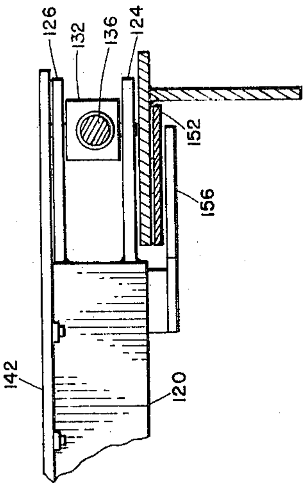
Figure 6:
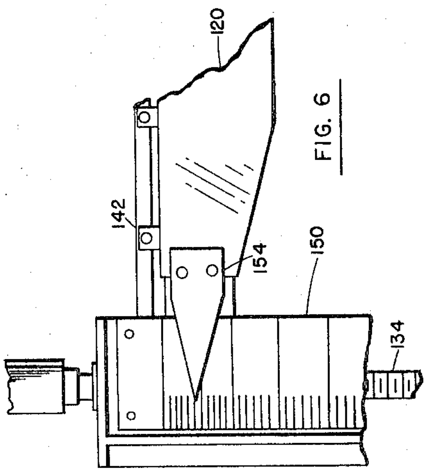
Figures 8, 9:
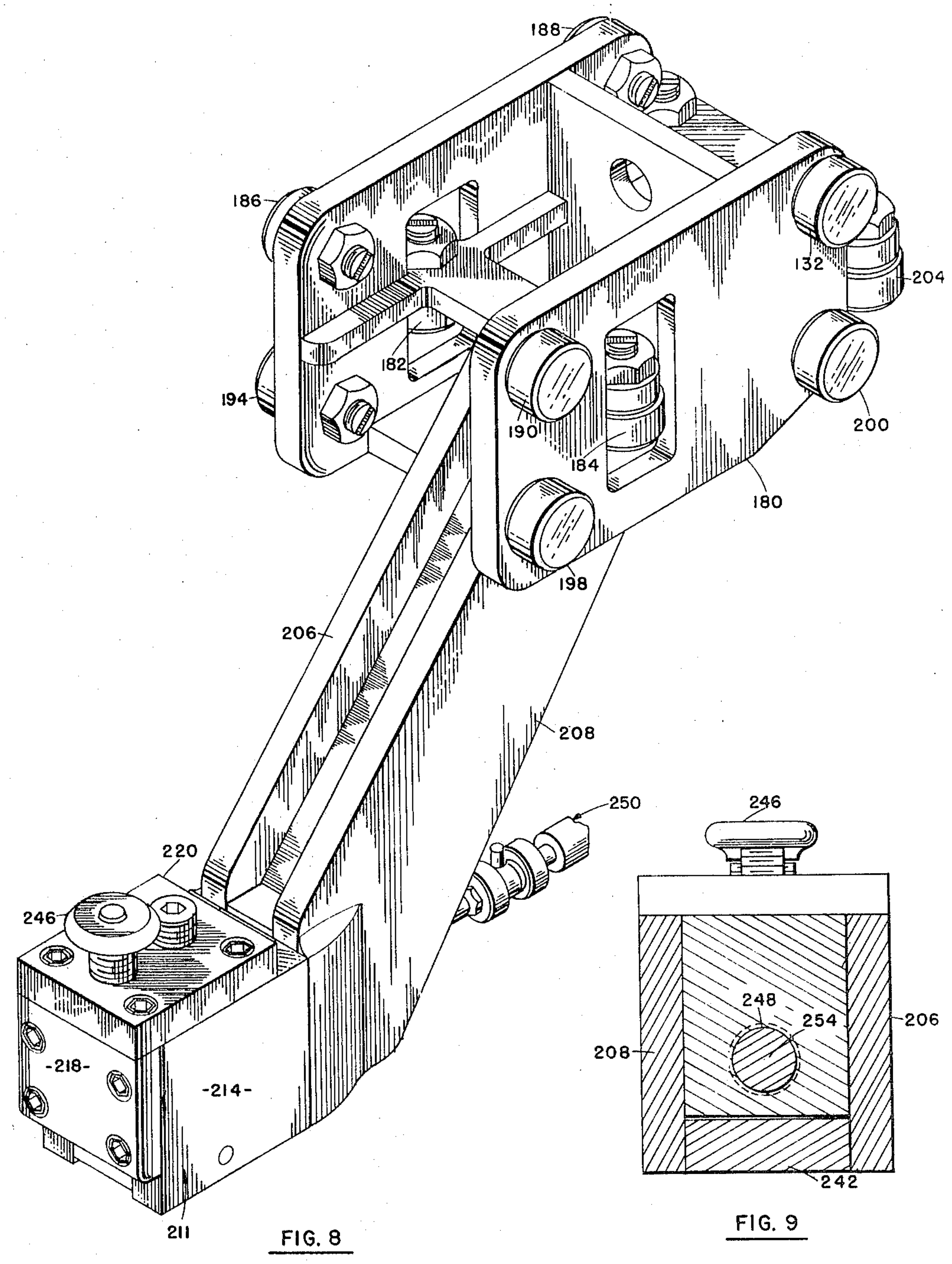

Other objects and advantages will become apparent upon a close reading of the following detailed description of an illustrative embodiment of the inventive concept, reference being had to the accompanying drawings, wherein:

FIGURE 1 shows, in end elevation and partly in section, a fragmentary view of the apparatus disclosed herein, with portions of structure omitted for the sake of clarity, FIGURE 2 shows a front elevation, partly broken away, of the apparatus of FIGURE 1, FIGURE 3 shows a general perspective view of the supporting structure between the table and the upper box frame members of FIGURE 1, with portions of structure omitted for the sake of clarity, FIGURE 4 shows an isolated enlarged cross-sectional view partly in elevation of the cylinder stack taken along line 4—4 of FIGURE 2, FIGURE 5 shows an isolated view in side elevation, partly broken away, of the force beam and positioning screws of FIGURE 1, FIGURE 6 shows a front elevation of one end of the force beam of FIGURE 5 and the scale indicator affixed thereto, FIGURE 7 shows a cross-sectional view taken along line 7—7 of FIGURE 5, with portions of structure added for clarity, FIGURE 8 shows an isolated perspective view of the sheet pulling carriage and clamp assembly shown in FIGURE 3.

Figure 10:
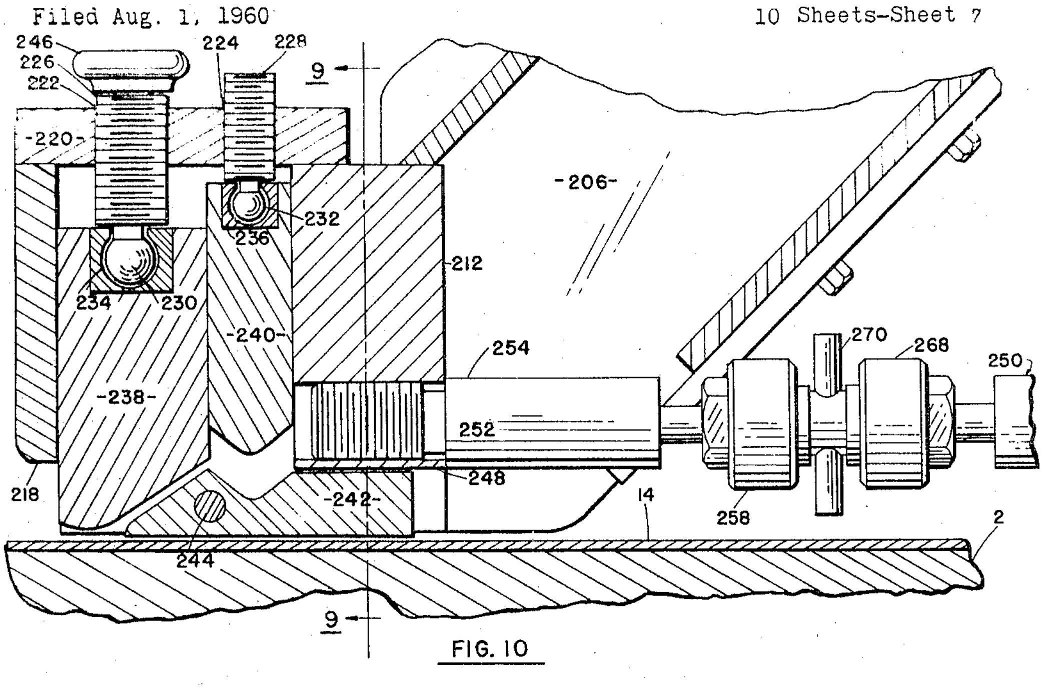
Figure 11:
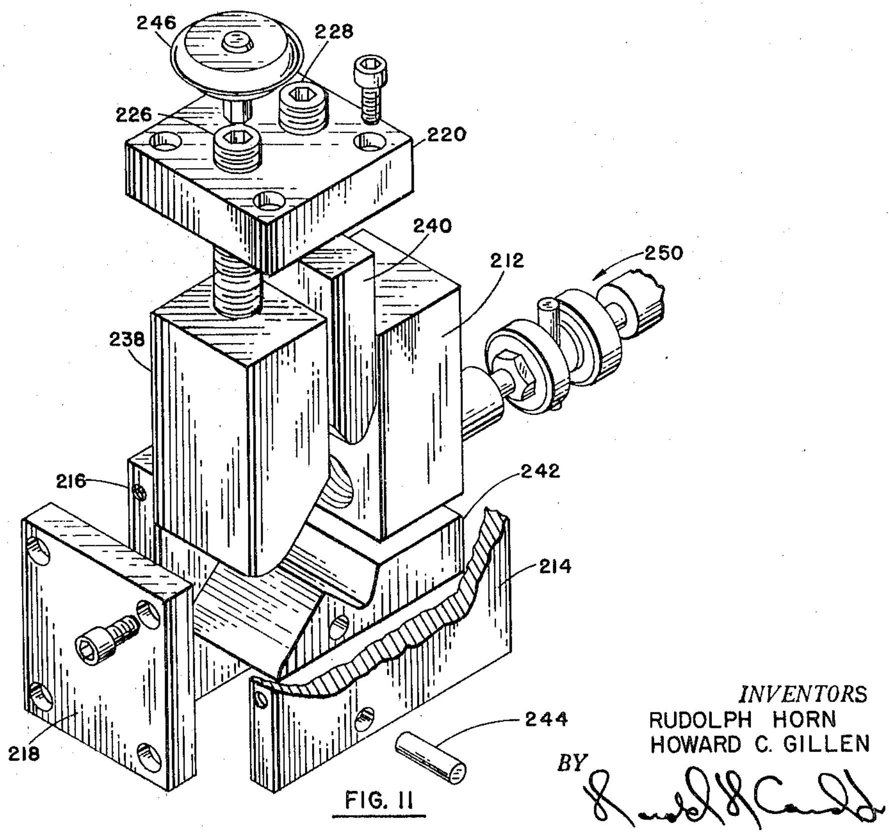
Figure 12:
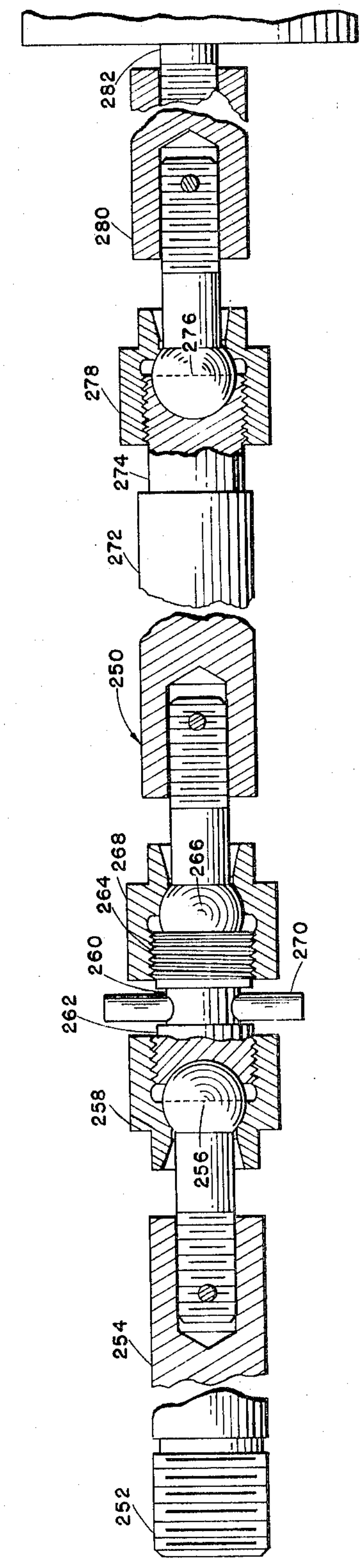
Figure 13:
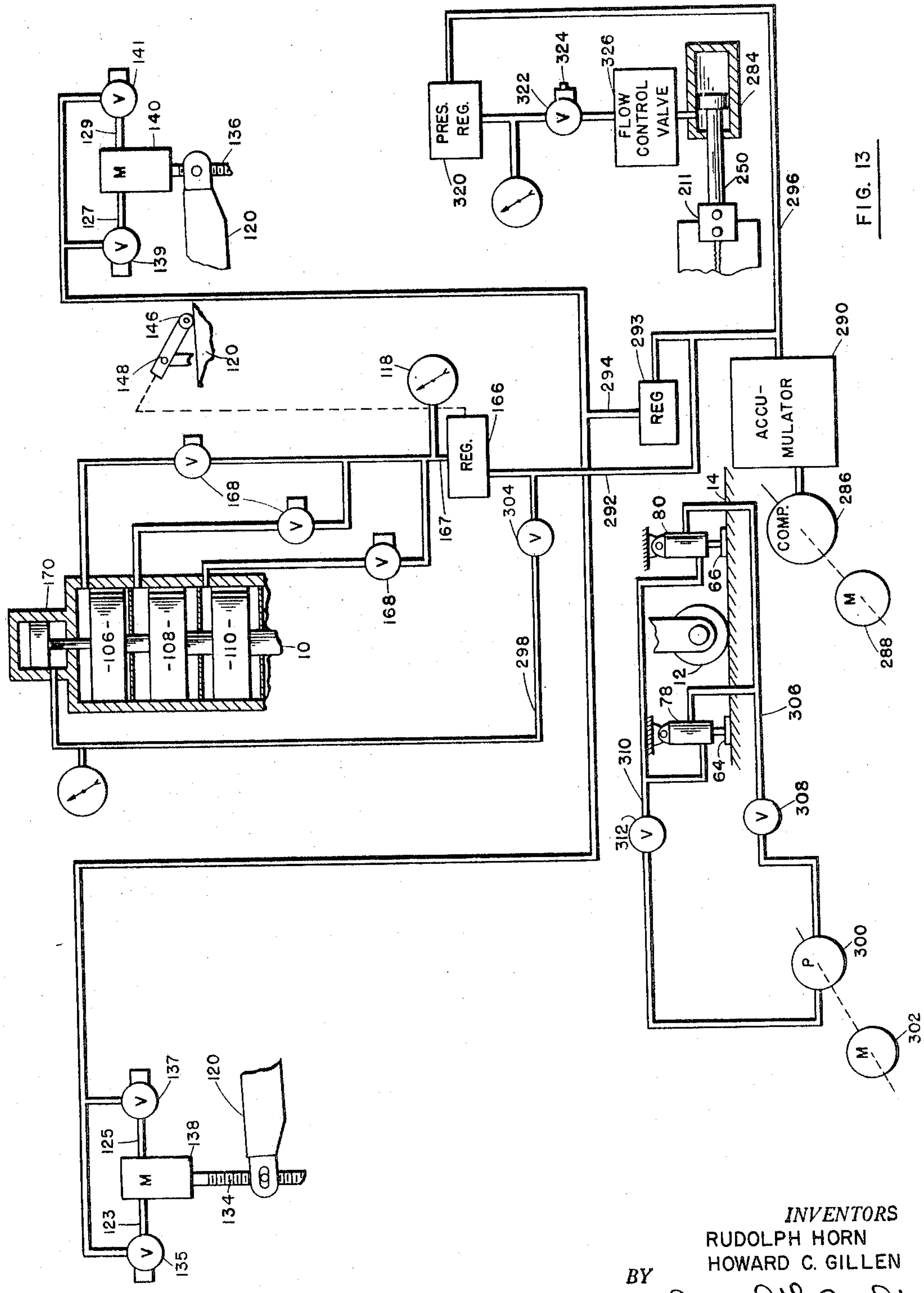
Figure 15:
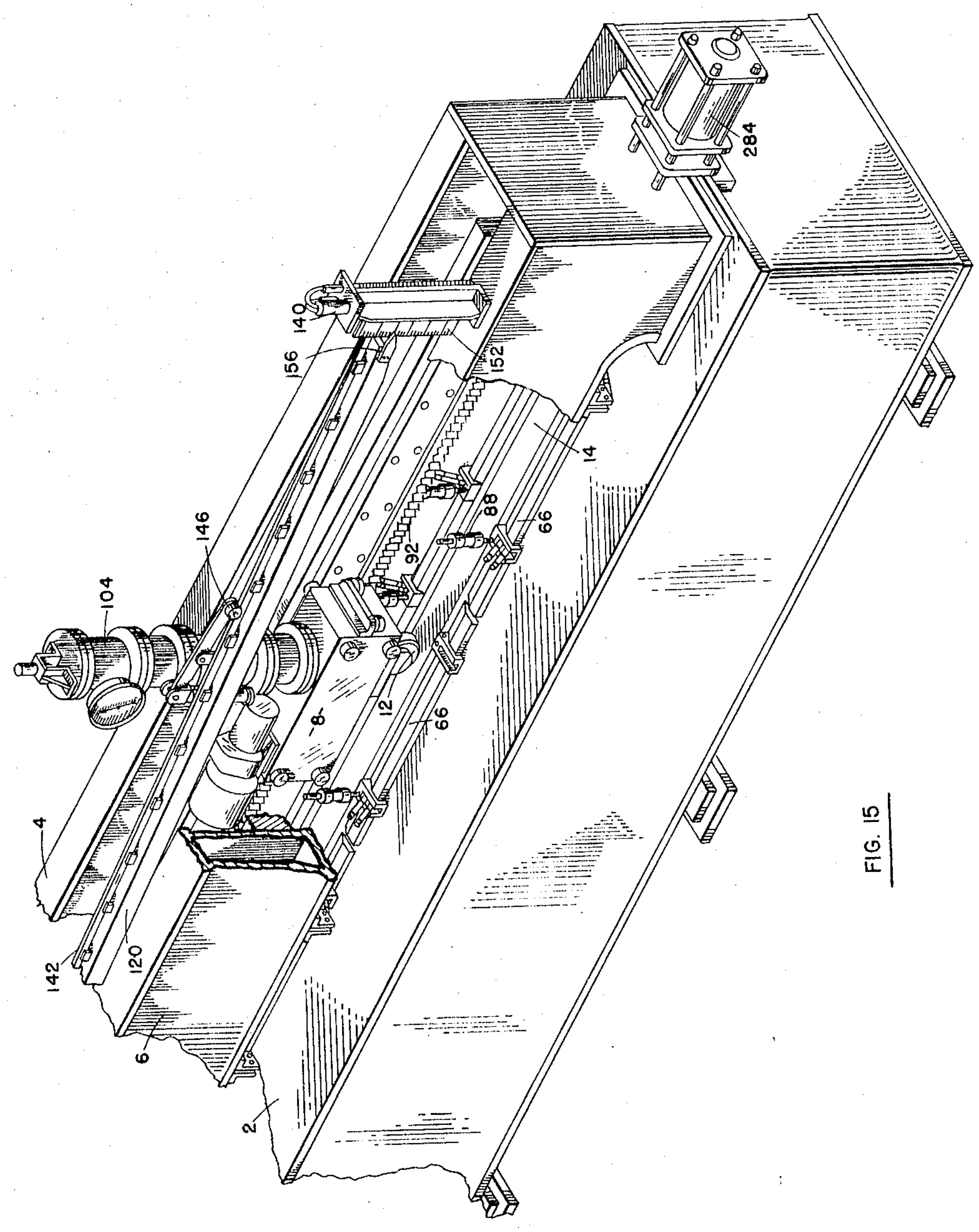

FIGURE 9 shows a cross-sectional view taken along line 9—9 of FIGURE 10,

FIGURE 10 shows a cross-sectional view taken along a longitudinal plane through the center of the clamp assembly shown in FIGURE 8, FIGURE 11 shows an exploded view of the clamp assembly shown in FIGURES 8 and 10, FIGURE 12 shows the coupling connections between the clamp assembly of FIGURES 8 through 11 and the sheet pulling cylinder shown in FIGURE 3, FIGURE 13 shows a schematic view of the hydraulic and pneumatic systems used for operation of the device shown in FIGURES 1 through 12, FIGURE 14 shows an isolated view, partly in cross-section, of the planishing wheel and adjacent structure in use with a T-section channel workpiece, and FIGURE 15 shows a general perspective view, partly broken away, of the overall machine disclosed herein, with portions of structure omitted for the sake of clarity.

With reference to the drawings described above, and particularly to FIGURE 1, the apparatus disclosed herein may be seen to include support means in the form of a table 2 having a hardened steel insert 14, upon the surface of which a workpiece may be supported for planishing by compressing means such as wheel 12, so that the workpiece material is compressed between wheel 12 and table 2. Supporting structure for wheel 12 is provided in the form of box beams 4 and 6 having tracks 16 and 18, respectively secured thereto by a plurality of bolts such as 56 and 58 and spaced therefrom by support plates 20 and 22. Wheel 12 is rotatably journaled at the lower extremity of a vertically movable shaft 10 slidably supported within a carriage 8 having means in the form of depending flanges 7 and 9 for preventing rotation of shaft 10 during its vertical movement. Rollers 11 and 13 mounted on flange 15 of shaft 10 are in continuous rolling contact with flanges 7 and 9 as shown in FIGURE 14, cooperating therewith to achieve the stated result. As shown in FIGURES 1 and 2, main carriage 8 is supported between tracks 16 and 18 for translational movement therealong. Support for such movement is provided by means of rollers 28–50. Of these, upper rollers 28–34 oppose the pull of gravity on carriage 8 and the elements mounted thereon, while lower rollers 36–42 oppose the reaction load caused by the downward force of wheel 12, and lateral rollers 44–50 prevent movement of carriage 8 laterally and resist directional change during translation of the carriage throughout its travel along tracks 16 and 18. Segmented key elements 24 and 26 of hardened steel are provided in the manner shown by FIGURE 1 for preventing relative movement between tracks 16 and 18 and mounting plates 20 and 22, respectively. Hardened key elements 24 and 26 insure that no relative movement will occur between the stated elements such as might otherwise adversely affect the accuracy of the planishing wheel 12. As shown by FIGURE 2, lateral rollers 46 and 48 are mounted on flanges 52 and 54 at either end of carriage 8. In addition, lateral rollers 44 and 50 are also mounted on flanges 52 and 54, respectively, whereby one pair of lateral rollers is located at each end of carriage 8.

In addition to the surfaces of elements 2 and 14 for supporting a workpiece under planishing wheel 12, holding means are provided in the form of elongate clamping elements 64 and 66 as shown in FIGURE 1 for preventing movement of the workpiece during the planishing operation. Both upward and downward movement of clamping elements 64 and 66 is accomplished by moving means including a plurality of cylinders such as 78 and 80 shown in FIGURE 1 acting on the stated elements by means of piston rods 82 and 84, respectively. Clamping elements 64 and 66 are continuously maintained in a horizontal position during vertical movement thereof by a plurality of pivot links such as 68, 70, 72, and 74. As shown by FIGURE 1, pivot links 68 and 70, for example, are connected in pairs between clamping element 64 and flanges secured to the bottom of box beam 4 such as flange 86. Similarly, pivot links 72 and 74 are connected between flange 88 and clamping element 66. Each of the stated pivot links includes a turnbuckle such as turnbuckle 76 mounted intermediate the ends thereof to permit adjustment in the lengths of each link as may be required to establish the horizontal position of each clamping element initially.

Drive means are also provided to permit movement of carriage 8 translationally along tracks 16 and 18 during the planishing operation, the stated means including elongate flange 90 at the lower end of box beam 4 as shown in FIGURE 1. Gear rack 92 is secured by appropriate means to flange 90 throughout its length. A pinion 94 is operatively engaged to gear rack 92 so that rotational movement of pinion 94 causes translational movement of the pinion with respect to stationary gear rack 92. Rotational movement of pinion 94 is caused by drive shaft 96 connected to suitable motor means such as reversible electric drive motor 98 through transmission 100 and gear box 102 as shown in FIGURE 2. Since drive shaft 96 is rotatably journaled within carriage 8, rotation of pinion 94 affixed to the shaft causes translational movement of the stated pinion and shaft, carriage 8, and all of the structure mounted on carriage 8, with respect to stationary box beams 4 and 6 and structure supported thereon.

The structure mounted on carriage 8 includes force means for applying force during the planishing operation, the stated force means including cylinder stack 104 comprising pressure means in the form of a plurality of adjoining cylinders vertically mounted and centered about force shaft 10. As shown by FIGURE 4, for example, cylinder stack 104 contains a plurality of pistons such as 106, 108 and 110, selectively operable within individual cylinders and affixed to force shaft 10. Each of the stated pistons supports the inner periphery of a pressure diaphragm 116, the outer periphery of which is secured within the cylinder wall surrounding the piston. Thus, the application of pressure on the upper side of piston 106 and diaphragm 116, for example, will result in downward force which is transmitted by piston 106 to shaft 10. By appropriate connections in the fluid pressure lines used to pressurize pistons within stack 104, sight gage means such as 118 may be provided to indicate the pressure applied to any or all of the stated pistons. Downward force applied to shaft 10 in the manner set forth above may cause movement of the shaft as permitted by bearings 112 within lower bearing mount 114 beneath cylinder stack 104 as shown, for example, in FIGURE 4.

Adjusting means are further provided for varying the amount of pressure applied to the pistons within cylinder stack 104. These include force beam 120 shown in FIGURE 2, the mounting for which is best seen from FIGURE 5. Force beam 120 is provided with flanges such as 122, 124 and 126 at either end thereof forming two yokes within each of which a cubical block such as 132 may be pivotally mounted by pivot pins 128 and 130, respectively. Cubical blocks 132 are each provided with a hole through the center thereof, by means of which each block is mounted on a rotatable lead screw 134 and 136 in threaded engagement therewith. Lead screws 134 and 136 are pivotally mounted upon stationary box beam 6 at each end thereof, as indicated by FIGURE 15, and are rotatable but otherwise do not move. Suitable means for rotating lead screws 134 and 136 are provided in the form of air motors 138 and 140 of conventional type as shown in FIGURE 5, each of which is reversibly rotatable, the direction of rotation depending on which of lines 123 and 125 or 127 and 129 leading to the air motors is pressurized. Actuation of either air motor 138 or 140 will rotate the lead screw with which that air motor is operatively engaged. Rotation of lead screws 134 and 136 causes vertical movement of the cubical block 132 threadedly engaged with each lead screw. This results from the fact that cubical block 132 mounted on lead screw 136, for example, as shown in FIGURE 7 is restrained from rotation by its pivotal connection between flanges 124 and 126 at the end of beam 120. Thus, rotation of lead screw 136 causes vertical movement of cubical block 132 either upwardly or downwardly depending upon the direction of rotation of the lead screw. Movement of cubical block 132 and movement of flanges 124 and 126 by reason of their attachment thereto, causes corresponding movement of the right-hand end of beam 120 as shown in FIGURE 5 either upwardly or downwardly. In like manner, rotation of lead screw 134 alters the vertical position of the left-hand end of force beam 120. Accordingly, it may be seen that force beam 120 is tiltable at various angles by actuation of air motors 138 and 140, the stated changes of angularity occurring about a center of rotation in pivot pin 130. Since pivot pin 128 at the left end of beam 120 in FIGURE 5 moves vertically in a straight path rather than in an arc with pivot pin 130 at its center, provision is made in the form of slot 131 in yoke 122 to permit limited relative movement between pivot pin 128 and the stated yoke during tilting movement of beam 120. An elongate cam track 142 is mounted on force beam 120 by means of a plurality of brackets 144. Thus, the position of cam track 142 is determined by and corresponds to the position of beam 120. A cam follower is provided in the form of roller 146 at one end of lever 148 which is pivoted by means of pin 158 on bracket 160 shown, for example, in FIGURE 2. The left end of lever 148 is enclosed within a yoke 162 at the upper end of connecting rod 164 operatively engaged within cylinder 166. Cylinder 166 comprises a pressure control valve of conventional type to which a constant inlet air pressure may be applied and which operates to vary the pressure at its outlet in accordance with vertical movement of connecting rod 164. Outlet pressure from control valve cylinder 166 is applied by appropriate connections to the upper surfaces of one or more pistons within cylinder stack 104. A scale such as indicated at 150 and 152 in FIGURES 6 and 7, respectively, is provided at each end of force beam 120 in stationary relationship thereto, and pointers 154 and 156 affixed to force beam 120 at the extremities thereof are provided to indicate the amount of pressure resulting at either end of beam 120 due to the action of cam track 142 upon control valve cylinder 166 acting through roller 146 and connections intermediate the stated roller and valve. While the stated plurality of pistons within cylinder stack 104 may be used to apply downward force upon wheel 12 through shaft 10, a single cylinder 170 mounted atop stack 104 is provided to apply upward force to shaft 10 and thereby raise wheel 12 off the workpiece.

Means are further provided in the device disclosed herein for optional use with specimens having thin walls, lacking stiffness, or the planishing of which might otherwise involve a risk of wrinkling by wheel 12 during the planishing operation. For example, the means referred to has been found useful during planishing operations performed on relatively thin sheets of metal foil of stainless steel composition. The stated means includes two clamps 210 and 211 disposed on either side of the workpiece, each having movable jaws which may be used to clamp tabs provided on each side of the workpiece for this purpose. Moderate force is applied on the stated clamp to exert a tensile pull on the workpiece, holding it flat and preventing wrinkles from developing on the planished surface during the action of wheel 12.

The stated wrinkle-prevention means includes a stationary clamp 210 shown near the upper left in FIGURE 3 and a movable clamp 211 best shown in FIGURES 8–11. FIGURE 8 shows a carriage 180 provided with a plurality of rollers 182–204 for rolling contact with tracks 16 and 18 described above. Rollers 186–192 contact the upper surface of the stated track and resist the pull of gravity on carriage 180 and elements connected thereto, while rollers 194–200 contact the under surface of the stated track and resist forces acting upwardly on carriage 180 and related components. Rollers 182, 184, 202, and 204 contact the inward facing surfaces of tracks 16 and 18 to prevent lateral displacement or directional change of carriage 180 during translational movement along the stated tracks. Carriage 180 is provided with two depending flanges 206 and 208, at the base of which the clamp generally denoted by reference numeral 211 is secured between two side walls 214 and 216 integrally formed on the two stated flanges. Adjustable holding means within clamp 211 are housed within six surfaces generally forming a cube and comprising back wall 212 integrally formed between flanges 206 and 208, side walls 214 and 216 mentioned above, front wall 218, top wall 220, and a lower or floor element 242. As shown by FIGURE 10, for example, top wall 220 is provided with two threaded holes 222 and 224, within which rotatable shafts 226 and 228 are threadedly engaged, respectively. Shafts 226 and 228 terminate at their lower ends in ball ends 230 and 232, respectively, each contained within spherical sockets 234 and 236 formed in the top surface of movable clamp elements 238 and 240. Clamp elements 238 and 240 are provided with angular or beveled surfaces at their lower end which cooperate with surfaces of opposite angularity on floor element 242 to hold a portion of workpiece material securely therebetween. Deformation of floor element 242 under the downward clamping force applied by clamp elements 238 and 240 is resisted by a plurality of dowels such as indicated at 244, the stated dowels passing through side walls 214 and 216 into the sides of floor element 242 in the manner suggested by FIGURE 11. Vertical movement of clamp elements 238 and 240 may be accomplished by appropriate means such as allen wrench 246 which may be formed with six flattened surfaces mating with corresponding surfaces in an opening formed at the upper end of shafts 226 and 228 to form torque transmitting connections for rotation of each shaft.

As shown in FIGURES 9 and 10, back wall 212 of clamp 211 is provided with a threaded opening 248 within which shaft segment 254 is engaged by corresponding threads 252. Pulling force to cause tensile loading of the workpiece is transmitted to clamp 211 by an elongate segmented shaft generally denoted by reference numeral 250 in FIGURE 12. End segment 254 shown in FIGURE 10 forms a part of shaft 250 as shown in FIGURE 12, and is threaded to ball element 256 for attachment to adjoining structure in the form of coupling member 260. Coupling member 260 is provided with two oppositely facing ball-receiving sockets 262 and 264 which mate with ball ended elements 256 and 266 on each side, and retain the same in close juxtaposition by retaining collars 258 and 268 threadedly engaged on ball retaining sockets 262 and 264, respectively. At the center of coupling member 260, torque handle means 270 is provided to facilitate assembly of the stated threaded components on either end of the coupling member. Ball ended member 266 is threadedly engaged in the end of shaft segment 272, the other end of which is provided with ball-receiving socket 274 in which ball ended element 276 is operatively engaged and securely retained by threaded collar 278. Ball ended element 276 is secured to shaft segment 280 by threads in the manner shown by FIGURE 12, and segment 280 is similarly joined to the end of rod 282. Rod 282 is connected to a piston within pneumatic cylinder 284 shown, for example, in FIGURE 3.

A general schematic view of the pneumatic and hydraulic systems forming a part of the device disclosed herein is shown in FIGURE 13. Although many variations in the various components and arrangements thereof are possible as a matter of common mechanical skill, the system shown in FIGURE 13 for the sake of illustration may be seen to include a single source of air pressure in the form of compressor 286 for supplying the various devices in the overall machine involving use of air pressure. Compressor 286 is driven by motor 288 and supplies pressure to supply lines 292, 294 and 296 through tank 290. Each of the three portions of the pneumatic systems supplied by the stated pressure supply lines is independently operable and may be considered individually.

As shown in FIGURE 13, line 292 supplies pressure for movement of shaft 10 by pressurization of cylinders within stack 104 or cylinder 170. The amount of pressure supplied to cylinder 170 is constant and equal to a moderate amount such as 30 p.s.i. above that pressure required to overcome the force of gravity on shaft 10 and components affixed thereto. The amount of pressure supplied to cylinders within stack 104 is varied by the action of regulator 166 in response to movement of cam roller 146 and lever 148 through mechanical connections described above and indicated by dotted line in FIGURE 13. Main supply line 167 supplies identical amounts of pressure to the inlet of each valve 168. Remotely operable valves 168 in the individual supply lines to each of the cylinders in stack 104 are normally closed, preventing the application of pressure from line 167 to the stated cylinders. Valves 168 may be solenoid actuated and independently operable to permit selective use of one or more cylinders in stack 104 depending upon the amount of downward force required to accomplish planishing by wheel 12.

Line 294 contains pressure controlled by regulator 293, and supplies pressure through individually operable valves 135, 137, 139 and 141 to air motors 138 and 140. Reversible air motors 138 and 140 may receive air under pressure from either of two opposed inlets 123 and 125, or 127 and 129, each of which is controlled by one of the stated valves as shown in FIGURE 13, the selection of such valves depending on the desired direction of rotation of the related air motor.

Line 296 may be seen to supply pressure to cylinder 284 through pressure regulator 320, valve 322, and valve 326. Valve 322 is manually operable by appropriate means such as push button 324 to open or close the same, for applying pressure to or venting pressure from cylinder 284.

The hydraulic system may be seen from FIGURE 13 to include a pump 300 driven by motor 302 for supplying fluid under pressure to supply line 306 through valve 308. Line 306 leads to hydraulic cylinders of conventional type such as schematically indicated at 78 and 80 for raising and lowering clamp elements 64 and 66. Line 310 also connects with cylinders 78 and 80 and permits application or release of pressure from the actuating piston within hydraulic cylinders 78 and 80 as controlled by valve 312. Pump 300 is reversible so that pressure may be applied to hydraulic cylinders 78 and 80 either through line 306 or line 310 depending on the desired direction of movement of clamp elements 64 and 66.

OPERATION

Although the apparatus disclosed herein may be used for planishing or forming a variety of diverse materials and shapes, its operation will not differ materially from the description set forth below in connection with planishing thin metal sheets. Operation of the planisher may be commenced by actuating valve 312 shown in FIGURE 13, to apply fluid pressure through line 310 to the cylinders connected to clamp elements 64 and 66. With valve 308 in the open position and pump 300 operated in a direction to supply pressure to the stated cylinders such as shown at 78 and 80 in FIGURE 13 through line 310, cylinders 78 and 80 will raise the stated clamping elements. Motor 288 may be operated to pressurize the pneumatic system, resulting in pressure from line 292 being applied to cylinder 170 through line 298 in an amount determined by regulator valve 304, causing cylinder 170 to raise shaft 10. This action raises wheel 12, permitting the workpiece to be layed on the top surface of table 2 under clamp members 64 and 66 with the area to be planished aligned under wheel 12.

Prior to the actual planishing operation, selection of the desired amount of force to be applied by wheel 12 on the workpiece and adjustment of the apparatus to produce the stated amount of force is necessary. The precise amount of planishing force necessary to produce the desired configuration in the finished workpiece will depend upon the thickness, the surface condition, the hardness and the shape of the workpiece. When a particular value of total downward force on wheel 12 is determined from consideration of the stated factors, selection of a number of cylinders in cylinder stack 104, and determination of a pressure within the selected number of cylinders sufficient to produce the stated amount of total force, are necessary.

Selection of a number of cylinders in stack 104 is made electrically by suitable means (not shown) such as a multiple-contact switch to actuate one or more valves 168 depending upon the number of cylinders desired for operation, each valve when opened permitting operation of the cylinder to which it is attached. Thus, for example, if the desired amount of downward force is within a low range requiring the use of but one cylinder in stack 104, then only the topmost valve 168 need be actuated to the open position, and only the topmost cylinder will, consequently, be pressurized by common inlet line 167. Following actuation of the number of valves 168 corresponding to the number of cylinders desired for operation, adjustment of beam 120 to produce the necessary amount of pressure in the cylinders selected for use is accomplished.

As indicated by the description of structure set forth above, the pressure which causes downward force on wheel 12 is supplied to the selected cylinders within stack 104 in an amount determined by the relative vertical position of cam roller 146. Any vertical movement of roller 146 during its translational movement along cam track 142 causes vertical movement of actuator rod 164, resulting in either an increase or decrease of pressure applied to inlet line 167 by regulator valve 166 and readable on gage 118. The relative vertical position of cam roller 146 is determined by the position of beam 120. Thus, for example, if the thickness of the workpiece material in the planish area is uniform, and constant pressure is desired throughout the stated area, then beam 120 will be positioned in a perfectly horizontal attitude so that cam track 142 will cause neither upward nor downward movement of roller 146 during traversing movement of wheel 12 across the planish area.

Beam 120 may be tilted or moved to a horizontal attitude by rotation of tilting screws 134 and 136, moving cubical blocks 132 which are pivotally attached to each end of the stated beam. Thus, after a number of cylinders in stack 104 have been selected for operation by opening the corresponding number of valves 168, air motors 138 and 140 may be actuated to rotate tilting screws 134 and 136 in a direction and an amount which will produce the position of force beam 120 causing movement of roller 146 an amount sufficient to provide a predetermined pressure to the selected cylinders which will result in the desired amount of downward force at wheel 12.

The amount of movement necessary to position force beam 120 in the position which will produce the desired amount of pressure within cylinder stack 104 may be determined from the values of pressure indicated by pointers 154 and 156 on pressure scales 150 and 152 on each end of the stated beam. Thus, for example, if it is determined that a pressure of 100 p.s.i. within each of the cylinders in stack 104 selected for operation is necessary to produce the desired amount of downward force at wheel 12, then lead screws 134 and 136 are rotated to move pointers 154 and 156 to the 100 p.s.i. mark on scales 150 and 152.

In the event that the workpiece has a gradually tapering thickness which decreases uniformly from one edge thereof to the other, and that a constant predetermined force on the workpiece will result from the application of a uniformly decreasing pressure within cylinder stack 104 such as from 100 p.s.i. at the thin edge of the workpiece to 200 p.s.i. at the workpiece edge having maximum thickness, then pointers 154 and 156 will be positioned to indicate 100 p.s.i. in one case and 200 p.s.i. in the other. Thus, cam track 142 will act upon roller 146 to produce a pressure of 200 p.s.i. at one extreme of roller travel, and will gradually alter the vertical position of the roller during its traversing motion to produce a pressure of 100 p.s.i. in stack 104 at the other extreme.

Before downward force is applied to the workpiece by wheel 12, the edges or ends of the workpiece on each side of the area to be planished may be secured within clamp 210 and 211. While the workpiece is securely held by the stated two clamps, valve 322 may be actuated by push button 324 to pressurize cylinder 284 such as required to produce a pulling force in shaft 250 resulting in the desired amount of tension in the workpiece. With the workpiece thus held in tension by clamps 210 and 211, and clamped securely in place by elements 64 and 66 at each side of the planish area, downward force in the desired amount as produced by the adjustments described above may be applied by wheel 12. Thereafter transmission 100 may be adjusted by appropriate means (not shown) to produce a desired speed of rotation of shaft 96. While the stated clamping, tensile, and rolling forces are applied to the workpiece, motor 98 may be electrically operated to cause rotation of drive shaft 96 at a speed determined by the adjustment of transmission 100. Rotation of drive shaft 96 and pinion 94 secured thereon causes translational movement of carriage 8 due to interengagement of pinion 94 with gear rack 92 as described above. Thus, carriage 8 may be moved translationally along tracks 16 and 18 in either direction depending uoon the direction of rotation of reversible motor 98, while force is simultaneously applied by wheel 12 along the path of travel traversed by the planishing wheel. When the desired physical improvement of the workpiece has been accomplished by the action of wheel 12, motor 98 may be stopped and the downward force of wheel 12 may be released by actuation of valves 168 to vent the pressure within the selected cylinders of stack 104 directly to atmosphere. Since cylinder 170 may remain continuously pressurized in an amount such as 30 p.s.i. in excess of that sufficient to overcome the force of gravity on shaft 10 and components affixed thereto, release of pressure in the cylinders of stack 104 used to apply downward force on wheel 12 will result in immediate upward movement of shaft 10 by the action of continuously pressurized cylinder 170. Thereafter, valve 312 may be actuated to apply pressure through line 310 to hydraulic cylinders 78 and 80, for example, to raise clamp elements 64 and 66. Also, valve 322 may be actuated to release air pressure within cylinder 284 so that pulling force is no longer exerted by shaft 250 on movable clamp 211. Wrench 246 may then be used to raise clamp elements 238 and 240 within clamp assemblies 210 and 211, permitting release of the workpiece.

The apparatus herein disclosed may be used for workpieces of various shapes and sizes other than sheet material such as used in the illustrative description of its operation set forth above. For example, FIGURE 14 shows use of the apparatus in planishing a joint in a welded channel 328 of T-shaped cross section. Vertical support for the top channel portion is provided by blocks 330 and 332, between which the depending channel portion is sandwiched during the planishing operation. Other adaptations of the apparatus herein disclosed for use with various shapes or sizes of workpieces and workpiece materials may be conceived.

From the description set forth above and illustrated in the drawings, it may be seen that the apparatus disclosed herein may be used for planishing joints and surfaces of great length on workpieces of various shapes and thickness, including sheets of .006 inch thickness, 20 feet width, and infinite length, to provide an accurately controlled area of improved smoothness and strength. This apparatus achieves the stated objectives and results even with materials of tapered or otherwise non-uniform thickness. When used on weld seams, for example, the apparatus increases the density of the weld material, smoothing, toughening and polishing the seam to improve its appearance and its strength.

While the particular structural details set forth above and in the drawings are fully capable of attaining the objects and providing the advantages herein stated, the structure thus disclosed is merely illustrative and could be varied or modified to produce the same results without departing from the scope of the inventive concept as defined in the appended claims.

We claim:

1. In apparatus for planishing a metallic workpiece, support means for supporting said workpiece in a stationary state during planishing thereof, and force means for applying force progressively and continuously along an area of said workpiece, said force means including compressing means for applying sufficient force to planish said workpiece material in the unheated condition in said area.

2. The apparatus set forth in claim 1 above, in which said compressing means is movable along a predetermined path of travel to apply said force progressively throughout said area.

3. The apparatus set forth in claim 2 above, including in addition thereto, adjusting means for adjusting the amount of said force applied to said compressing means.

4. The apparatus set forth in claim 3 above, wherein said adjusting means includes pressure means for varying the amount of said force at a uniform rate from a predetermined value at one end of said area to a relatively different value at the other end of said area.

5. The apparatus set forth in claim 4 above, wherein said pressure means includes a plurality of cylinders independently pressurizable so that a predetermined number of said cylinders may be pressurized to apply said force to said compressing means.

6. In apparatus for planishing a workpiece, support means for supporting said workpiece in a stationary state during planishing thereof, holding means for holding said workpiece in stationary contact with said supporting means, force means for applying force progressively on said workpiece to planish the same and suspension means for suspending said force means vertically above said support means, said suspension means comprising frame means mounted on said support means, track means affixed to said frame means for movably supporting carriage means, carriage means supported by said track means, and shaft means mounted on said carriage means for connecting said compressing means to said carriage means.

7. In apparatus for planishing a metallic workpiece, support means for supporting said workpiece in a stationary state during planishing thereof, force means for applying force on an area of said workpiece, said force means including compressing means for applying sufficient force to planish said workpiece material in said area, and tension means for applying a tensile load to said workpiece in said area during application of said force thereon.

8. In apparatus for planishing a workpiece, support means for supporting said workpiece in a stationary state during planishing thereof, holding means for holding said workpiece in stationary contact with said supporting means, and tension means for applying a tensile load to said workpiece during planishing thereof.

9. In apparatus for planishing a workpiece, table means for supporting a workpiece in a stationary state during planishing thereof, force means for applying force on an area of said workpiece to planish said area, said force means including compressing means for applying sufficient force to planish said workpiece material in said area, said compressing means movable along a predetermined path of travel to apply said force progressively throughout said area, adjusting means for adjusting the amount of said force applied to said compressing means, said adjusting means including pressure means for varying the amount of said force at a uniform rate of change from a predetermined value at one end of said area to a relatively different value at the other end of said area, said pressure means including a plurality of independently pressurizable cylinders in vertical alignment and supported on carriage means, holding means for holding said workpiece in stationary contact with said table means, said holding means including moving means for moving said holding means to an inoperative position to release said workpiece or toward a holding position to hold said workpiece in said stationary condition, suspension means for suspending said force means vertically above said support means, said suspension means comprising frame means mounted on said support means, track means affixed to said frame means for movably supporting carriage means, carriage means supported by said track means and in rolling contact therewith for translational movement therealong, shaft means mounted on said carriage means for connecting said compressing means to said carriage means, drive means operatively interengaging said carriage means with said frame means to cause movement of said carriage means, and motor means mounted on said carriage means and connected to said drive means.

10. The method of planishing a workpiece by placing said workpiece on a stationary support, holding said workpiece stationary on said support, and applying a predetermined amount of constant compressive force to planish said workpiece in a predetermined area.

11. The method set forth in claim 10 above, including in addition thereto, the step of applying a continuous force on said workpiece to place said area in tension during said application of compressive force thereon.

12. The method of planishing a workpiece by placing said workpiece on a stationary support, holding said workpiece stationary on said support, and applying a gradually changing amount of compressive force to planish said workpiece in a predetermined area, said change of force occurring at a uniform rate.

13. The method set forth in claim 12 above, including in addition thereto, the step of applying a continuous force on said workpiece to place said area in tension during said application of compressive force.

14. The apparatus set forth in claim 7 above, wherein said force means includes a cylinder stack comprising a plurality of adjoining cylinders, an axially movable shaft, a piston translationally movable within each of said adjoining cylinders, each of said pistons operationally secured to said shaft, said force means further comprising pressure means for pressurizing at least one of said cylinders to cause axial movement of said shaft, and said compressing means comprising a wheel rotatably mounted on said shaft whereby said pressurization of said cylinders applies said planishing force.

15. The apparatus set forth in claim 4 above, including in addition thereto, suspension means for suspending said force means vertically above said support means, said suspension means comprising frame means mounted on said support means, track means affixed to said frame means for movably supporting carriage means, carriage means supported by said track means, shaft means mounted on said carriage means for connecting said compressive means to said carriage means, drive means operatively interengaging said carriage means with said frame means to cause movement of said carriage means, and motor means connected to said drive means.

16. The apparatus set forth in claim 4 above including in addition thereto, suspension means for suspending said force means vertically above said support means, said suspension means comprising frame means mounted on said support means, track means affixed to said frame means for movably supporting carriage means, carriage means supported by said track means, shaft means mounted on said carriage means for connecting said compressive means to said carriage means, said pressure means including a plurality of cylinders independently pressurizable so that a predetermined number of said cylinders may be pressurized to apply force to said compressing means, said cylinders being mounted in vertical alignment with said shaft means centered therein and supported on said carriage means.

17. In apparatus for planishing a workpiece, support means for supporting said workpiece, force means for applying force on an area of said workpiece to planish said area, said force means including compressing means for applying sufficient force to planish said workpiece material in said area, holding means for holding said workpiece in stationary contact with said supporting means, said holding means including moving means for moving said holding means to an inoperative position to release said workpiece or toward a holding position to hold said workpiece in said stationary condition, said moving means including a plurality of fluid cylinders operatively connected to said holding means.

18. In apparatus for planishing a workpiece, support means for supporting said workpiece in a stationary state during planishing thereof, force means for applying force on an area of said workpiece to planish said area, said force means including compressing means for applying sufficient force to planish said workpiece material in said area, suspension means for suspending said force means vertically above said support means, said suspension means comprising frame means mounted on said support means, track means affixed to said frame means for movably supporting carriage means, carriage means supported by said track means, shaft means mounted on said carriage means for connecting said compressing means to said carriage means, and drive means operatively interengaging said carriage means with said frame means to cause movement of said carriage means.

References Cited by the Examiner

UNITED STATES PATENTS

| | | | |
|---|---|---|---|
| 184,015 | 11/1876 | Landon | 80—19 X |
| 415,818 | 11/1889 | Miner | 80—19 |
| 1,162,536 | 11/1915 | Winterhoff | 80—19 |
| 1,908,267 | 5/1933 | McBain | 80—40 |
| 2,010,650 | 8/1935 | Stone | 29—552 |
| 2,023,085 | 12/1935 | Lavalee | 219—82 |
| 2,025,421 | 12/1935 | Rippel | 29—33.1 |
| 2,040,755 | 5/1936 | Meyer | 80—56.3 |
| 2,063,386 | 12/1936 | Langford | 29—552 |
| 2,263,425 | 11/1941 | McKee. | |
| 2,265,052 | 12/1941 | Anderson | 29—33.2 |
| 2,304,976 | 12/1942 | Watter | 78—13.1 |
| 2,466,644 | 4/1949 | McBride | 29—81 |
| 2,472,083 | 6/1949 | Bartholdy | 269—134 |
| 2,655,823 | 10/1953 | Cozzo | 80—56.1 |
| 2,696,547 | 12/1954 | Felton et al. | 219—161 |
| 2,701,485 | 2/1955 | Felt et al. | 80—19 |
| 2,736,222 | 2/1956 | Campbell | 82—14.1 |
| 2,792,730 | 5/1957 | Cozzo | 80—56.3 |
| 2,896,485 | 7/1959 | Tiedemann | 80—19 |
| 2,922,870 | 1/1960 | Collins et al. | 219—125 |
| 3,019,678 | 2/1962 | La Fiell | 80—14 |
| 3,081,651 | 3/1963 | Roberts | 80—35.1 |

CHARLES W. LANHAM, *Primary Examiner.*

WHITMORE A. WILTZ, LEON PEAR, ROBERT F. WHITE, *Examiners.*

E. H. MARTIN, C. H. HITTSON, H. D. HOINKES, *Assistant Examiners.*